May 22, 1945.  G. H. KENDALL  2,376,779
PROCESS FOR MAKING ANTIFRICTION BEARINGS
Filed Sept. 30, 1942

Inventor
George H. Kendall
By Wooster & Davis
Attorneys.

Patented May 22, 1945

2,376,779

UNITED STATES PATENT OFFICE 2,376,779

PROCESS FOR MAKING ANTIFRICTION BEARINGS

George H. Kendall, Noroton Heights, Conn., assignor of one-eighteenth to Elizabeth B. Dickson, one-eighteenth to T. C. Dickson, Jr., two-eighteenths to E. W. Bassick, Jr., one-eighteenth to Christine N. Bassick, one-eighteenth to Marshall M. Bassick, one-eighteenth to Paulina M. Bassick, one-eighteenth to Grace M. Bassick, and one-eighteenth to E. W. Bassick, all of Bridgeport, Conn.

Application September 30, 1942, Serial No. 460,195

19 Claims. (Cl. 29—148.4)

This invention relates to anti-friction bearings and more particularly to a new and improved process of bearing ring fabrication for anti-friction bearings of any of the various types, as for either the ball or roller type, or any of the other roller types, such as square, needle, taper, spherical, concave and so forth, and may be employed for either radial, thrust, or combinations of radial and thrust bearings.

This application is a continuation in part of my prior applications for patent for anti-friction bearings, Serial No. 357,107, filed September 17, 1940, and Serial No. 408,267, filed August 25, 1941.

It is an object of the invention to provide a new and improved process of fabricating and bringing the rings accurately to the proper size, principally without stock removing operations with the result that a ring may be fabricated in about five operations, and at far less cost, as contrasted with the conventional processes of fabrication for the standard bearing which are conducted entirely by methods of stock removal operations requiring about ten operations to fabricate and at much greater cost.

It is also an object to provide a process of bearing ring fabrication which effects a major decrease in the quantity of machinery required in making the bearing over that required for the old processes.

Similarly it has for another object a major decrease in the invested capital required to provide a bearing manufacturing plant of a given capacity from that needed for present day processes.

A further object is to provide a process in which novel tooling and die methods of mold and sizing fixtures produce far more accurate and uniform bearing rings than is possible with present day processes using stock removal operations which do not hold the exact size from piece to piece.

Still another object of the process is the manufacture of an anti-friction bearing ring comprising a raceway ring of the usual hard steel alloys now employed in standard practice, of somewhat less than standard size but preferably of sufficient thickness to carry the normal rolling loads, backed up and brought to standard size by a backing and supporting member of relatively softer and more readily workable material which may be brought to the exact finished sizes by cold working of the surfaces of the softer material without stock removal, thus eliminating the large number of chucking operations and finishing operations involving stock removal employed in the present day processes.

Still another object is the development of a process which will permit of mold grooving in casting so that all types of dust plates, grease shields, seals, covers and the like may be dropped in place and fully assembled without stock removal operations and without operations on the raceway ring, by simply staking or spinning the softer and more workable material forming the outer edge of the groove, to thus permit rigid assembly without distortion of the hard steel raceway ring now causing so much trouble in present day processes by damaging raceway accuracy.

With the foregoing and other objects in view I have devised a method for fabrication of anti-friction bearings, several of which bearings and method of fabrication are illustrated by way of example in the accompanying drawing forming part of this specification. It is, however, to be understood that these do not represent all of the types of bearings which may be made by this process, and also that various changes and modifications may be employed within the scope of the invention.

*Present standard bearing construction and process of manufacture*

The present standardized bearing construction consists of two special alloy steel rings hardened and normalized to produce an extremely hard surface for the balls or other rolling elements to roll upon in carrying the load. This extreme degree of hardness is found to be of first importance to carry the rated load of the bearings and as necessary to prevent damage to the ring raceway by denting or ball or roller imprinting from rough handling or abuse of the equipment in which the bearings are mounted. This will be readily apparent when it is realized that there is a very small area of the ball or roller in contact with the raceway surface which must carry the load imposed.

The manufacture of these bearings involves turning the bearing rings of very tough steel from heavy bars, forgings, or very heavy steel tubes, with a waste of nearly one-half or over (depending on the size) of the weight of the steel in chips, cut-off ends, and so forth, and furthermore they require many additional finishing operations to bring them to the finished size, all of which operations involve removal of stock and they include numerous chucking operations which add to the difficulties of producing bearings of the required extremely accurate dimensions and free from errors of eccentricity, wobble and non-parallelity.

This present day manufacture commonly uses multi (usually four or six) spindle automatic screw machines in rough turning ball bearing steel from tubing or rod stock into bearing rings. The outer diameter, the bore and both faces are turned on these machines. Other turning operations, such as for dust shields, grooves, seal lands for rubbing surfaces, and the like, the ball raceway grooves and so forth, are usually handled on hand screw or turret lathe machines.

Some manufacturers use either hot or cold forgings in place of large tubing stock and turn the rings with turret lathes instead of automatic screw machines.

Other manufacturers stamp and draw the ring blanks from heavy bearing steel plates. The rings so formed are next turned with the turret lathes in the same manner.

The turned rings next move along for soft grinding of one face of the ring and are then turned over and passed through the same machine a second time for grinding the opposite face of the ring. They are next machine die-stamped with the bearing number, type, firm name and any other identification desired on one side of the ring, the other side always being left plain without marking of any kind.

The rings are next hardened and normalized under the rigid sensitive control needed for ball bearing steel to assure uniformity for this precision product. The hardened rings next move to the finish grinding operation for finish grinding of one face and are then passed through the machine a second time, after turning over, to finish the other ring face to proper width specifications.

The ring outside diameter (whether outer or inner rings) is next finished to size on the centerless grinding machine which may require passing through the machine from seven to ten times to bring to the exact size required. The inner rings are then finished on the bore with internal grinding machines. This provides the finished size for mounting the ring on arbors to accurately grind the raceways, on raceway grinding machines, concentric with the bore. The outer rings are held by the finished outside diameter and the raceway finished in raceway grinding machines concentric with the outside diameter.

Both inner and outer rings now pass to the final finishing operation on the raceway surfaces to remove all grinding cut marks and any other irregularity to produce an extremely smooth surface by any one of several methods that may be preferred by the individual manufacturer.

The standard rings are now considered as completely fabricated and go to the stock-room for parts until called for for assembly in the bearing.

All washing and inspection operations have been omitted from this description for reasons of simplicity and clarity.

New process

The present new process is based upon the principle that instead of cutting away so much tough, hard and valuable steel in chips to produce the finished size with a great many different chucking operations, initially the hard steel ring is made somewhat below the desired finished size (as for example by cutting this hard steel ring from tubing somewhat smaller than the desired finished size of the ring), and a relatively thin layer of softer and more workable material is permanently bonded to the ring (such for example as casting, molding, preformed and bonded, or built-up) to bring the ring to the finished size without any stock removal operations and then brought to the exact dimensions through plastic working (as for example by cold working of the surfaces of the softer material by coining and sizing operations, although other types of cold working and working tools may be used). The raceway surface for the rolling elements may then be finally finished free of all process distortions.

This invention relates primarily to the exterior portions of the rings (that is, the outside diameter), both faces and the bore of the bearing. The internal factors of the raceway surfaces, rolling elements, retainer, load-carrying rated capacity or other combinations of functions and technique of the bearing art are not changed or altered in any way from standard practice, so that the new process does not interfere with or change the methods of using and applying standard bearings now widely established as standard practice all over the world.

This new process provides a softer and more workable material at the exterior surfaces of the bearing ring, so that the ring may be coined to exact dimensions of width, and held by the tools used for the coining operation while it is sized to the exact required diameter in the same operation, at high speed and highest efficiency. The slight plastic flow, or cold working as it is sometimes called, of the coining and sizing operations readily produces the exact finished size and smooth finished surface without the many stock removal operations of present day methods of manufacture. Cold working of the softer and more workable material tends to harden and toughen it (particularly if it is of metal) as well as to produce better and far superior surface finishes, which are all considered to be particularly beneficial. It is to be distinctly understood that while the outer material is softer and more workable than that of the raceway ring, it is of a degree of hardness to withstand the load without materially changing its repose dimensions. In other words, it is desirable that the finished ring be as unyielding and retain its size and shape as effectively as if it were composed entirely of the special alloy steel used for the raceway ring, and the hardening and toughening of the softer material by the cold working is an advantage in assisting in the securing of this result. In this method none of the valuable steel is lost in cutting away as chips or grinding sludge except in slight grinding required in finishing the raceway surfaces.

In this process there are no stock removal operations on the hard alloy steel raceway ring other than the initial cut-off from the rod or tubing stock or forging, the turning of the raceway, and the final raceway grinding operation. The hard tough alloy steel surfaces of the faces and diameters of this raceway ring are not further finished, as this new process provides a relatively thin layer of softer and more workable material cast or otherwise formed to finished size, that may be caused to plastic-flow or cold-flow slightly to the exact dimensional size without stock removal operations. It is necessary that only sufficient of the softer and more workable metal be applied to the steel raceway ring to cover the irregularities in the surface and the inner eccentricities, but it may be built up to greater thicknesses as desired for certain applications or to facilitate fabrication and finishing operations.

Figure 1:
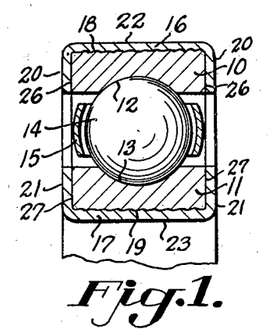
Fig. 1 is a transverse section through the inner and outer ring members of an assembled anti-friction bearing which may be fabricated by my process.

This basic principle may be applied in many forms to any ring construction in that this relatively thin layer of a softer and more workable material may be used as the outside diameter and both faces of an outer bearing ring (or both faces and the bore of an inner bearing ring), so that all exterior surfaces are completely covered. Such arrangement is shown in Fig. 1 of the drawing, in which the outer raceway ring of hardened tough alloy steel is shown at 10 and the complementary inner raceway ring of the same material is shown at 11. The outer ring has the inner raceway 12 and the inner ring a complementary outer raceway 13 for the rolling elements such for example as the balls 14, held in proper spaced relation by any suitable type of retainer 15. The raceway rings 10 and 11 are somewhat smaller than the desired finished or standard size and are brought to this size by the softer and more workable material 16 and 17, covering the outer diameter and side faces 26 of the outer ring 10 and the inner diameter and side surfaces 27 of the inner ring 11. The softer and more workable material is permanently bonded to the surfaces of the raceway ring. This may be effected in different ways, but one way is to knurl, sharp groove or otherwise roughen the contiguous surfaces 18 and 19 of the raceway ring so that the softer metal will work into and fill the depressions in the roughened surface and form a permanent bond. Preferably the surfaces are knurled by crossing lines such as in a double-cut file, but the edges should for best results be slightly rounded and not sharp so as to not produce sharp corners in the added metal from which cracks or similar failures could start. When the outer member is built up by fused metal such as in pressure die casting, there is also a certain amount of alloy or fusion bonding of this metal to the surface of the heavier bearing steel or raceway ring. The side surfaces 20 and 21 respectively of the outer and inner bearing rings, the outer diameter surface 22 of the outer ring and inner surface 23 of the inner ring are brought to the exact finished sizes or dimensions by working so as to cause plastic-flow of the material at these surfaces, preferably by cold working with coining and sizing operations, examples of the procedure of which will presently be described.

Figure 2:
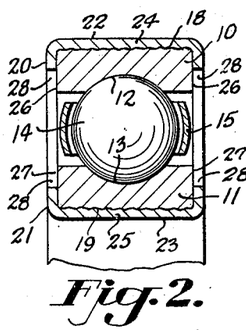
Fig. 2 is a similar section showing a somewhat modified construction.
Figure 4:
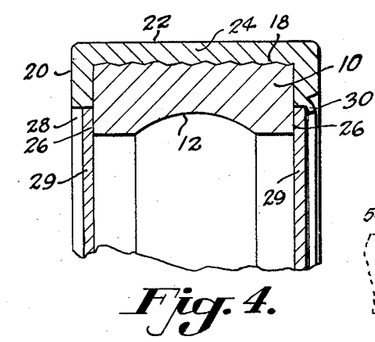
Fig. 4 is a transverse section on an enlarged scale of an outer bearing ring of the type shown in Fig. 2 and illustrating how this process facilitates anchoring of the dust or similar plates.

In Fig. 2 is shown a slightly modified construction in which only part of the side faces 26 and 27 of the raceway rings 10 and 11 are covered by the softer and more workable material 24 and 25 corresponding to material 16 and 17 of Fig. 1. This leaves portions of the side surfaces 26 and 27 of the rings 10 and 11 exposed or uncovered so that the raceway rings 10 and 11 may be gripped in a chuck or other holding means to hold the bearing for finishing operations, such for example as grinding the raceway or for performing any other desired operation, as finishing the outer surfaces 22 or 23. These side surfaces may also be gripped for holding the raceway ring in the die casting or other molds. This also provides groove spaces 28 for assembly of all types of dust plates, grease shields, seals or similar coverings, and so forth, by staking or spinning operations on the edges of the softer material. An example of how this may be accomplished is shown in Fig. 4. As shown in this figure, a dust plate or shield 29 is shown as seated on the exposed portion of surface 26 and then the edge portion of the softer material 24 at the side of the ring is staked or spun over, as shown at 30, over the edge of this plate or disc to hold it in position. This operation may be performed by a suitable staking or spinning tool, and it will be seen that it in no way deforms or places any strain on the raceway ring 10 or 11 so that it would in any way cause this ring to be forced out of shape or the accuracy of the raceway otherwise damaged, as is practically always the case where the raceway ring of a standard bearing is deformed or operated upon for mounting such rings.

Figure 3:
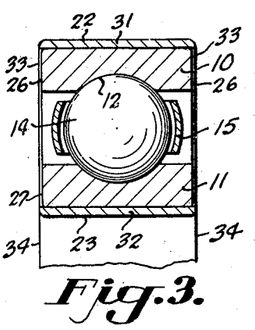
Fig. 3 is a similar section showing a still further modified construction.

A still further modification is shown in Fig. 3 in which the relatively thin softer and more workable material 31 and 32 bonded to the rings 10 and 11, instead of being carried around to cover any of the side walls of these rings covers only the outer cylindrical surface of the outer ring 10 and the inner cylindrical surface of the inner ring 11, but this material is extended somewhat beyond the side surfaces 26 of these rings so that it is not necessary to accurately finish these side surfaces, and to permit plastic flow or cold working of this material, as previously described in connection with Figs. 1 and 2. Thus for example, when the side surfaces 33 and 34 are coined to secure the proper width of finished ring, the material will plastic-flow slightly and the coining dies may be stopped by the high points or minute areas of the hard alloy steel faces 26, but the widths of the rings 10 and 11 should never be greater than the desired width of the finished fabricated ring, so that the coining dies will be allowed to move sufficiently toward each other to give the desired finish dimensions. The softer material 31 and 32 could be applied and bonded to the rings 10 and 11, the same as in Figs. 1 and 2, by casting or molding against a knurled or roughened surface, or other appropriate ways, but in this case as the softer metal does not cover the side walls of the raceway ring, the composite ring may be cut off from a composite tube comprising an inner tube of proper thickness for ring 10 and an outer tube of proper thickness for metal 31 (these two tubes being of course reversed for the inner ring 11, 32) and drawn to the proper size in suitable dies and permanently bonded together by brazing or other processes, as will later be more fully described.

Figure 5:
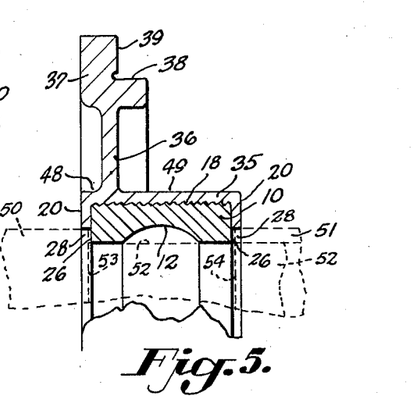
Fig. 5 is a section of an outer ring of an anti-friction bearing showing how the softer material may be extended to form an end housing or other mounting and supporting means for the bearing and fabricated according to this process.

In Fig. 5 is shown how the covering of softer and more workable material may be extended to provide mounting supports of different shapes and sizes and provided with mounting surfaces in different relations to the raceway ring and its raceway. Only the outer ring of the bearing is shown, comprising the raceway ring 10 of hardened alloy steel, having its outer knurled or otherwise roughened surface 18 and a portion of the side walls 26 covered with the softer and more workable material 35. The arrangement is similar to that of Fig. 2 except that the material 35 is extended to form the web or spokes 36 supporting an outer rim 37 provided with accurately finished and located mounting surfaces 38 and 39. This extension can take various shapes, such for example as pulleys, gears, etc., wherein the supporting surface becomes the working surface and is of vital importance for locating the pitch line in accurate relation to the raceway surface, that shown being in the form of an end frame for a small motor or generator and mounted and located by the surfaces 38 and 39 in the housing of the motor or generator, or it could be the mounting means for the bearing in the housing or frame of any machine. The inner ring of the bearing could be that shown in either Figs. 1, 2 or 3.

Figure 6:
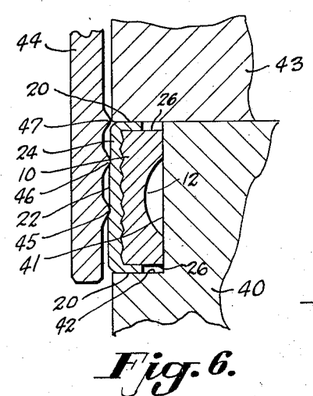
Fig. 6 is a section through a portion of one type of dies which may be employed in this process for bringing the rings to exact size.

In Fig. 6 are shown in section portions of a set of dies and a bearing ring indicating an effective arrangement of tools for carrying out the finishing and sizing steps of the process. The composite bearing ring indicated is the same as that in Fig. 2 although the other forms shown in Figs. 1, 3 and 5 can be treated the same way. The ring including the raceway ring 10 of the alloy bearing steel and the outer or covering member 24 of the softer or more workable material is mounted on and centered by the die member 40 which may be a stationary member reduced at 41 to center the bearing ring and provide a shoulder 42 on which the ring is seated and supported. The height of this reduced portion corresponds to the desired finished width of the bearing ring and it forms a stop to limit the downward movement of the plunger 43 of the die. It will therefore be evident that as the plunger 43 is lowered to carry it against the member 40 it will cold-work or plastic-flow the outer side surfaces 20 of the softer material 24 to bring it to the accurate dimensional width of the finished ring. After this operation is completed, or simultaneously therewith, so that the bearing ring is rigidly gripped and held, a second movable die member 44, such for example as a sleeve, moves downwardly over the outer surface 22 of the softer material. On the inner wall of this sleeve are working surfaces such as slightly raised ribs 45, 46 and 47, somewhat spaced from each other and preferably of slightly different diameter, the rib 45 being of the largest diameter and the rib 47 of the smallest, the rib 47 being of a diameter to give the exact finished diameter to the outer surface of the ring. As these ribs move over the surface of the softer material, the rib 45 slightly cold-works this surface causing slighth plastic-flow of the material thereof and reducing the diameter of the ring slightly. This action is followed by similar action of the rib 46, and the final working to the exact finished size is accomplished by the rib 47. Of course in finishing and sizing the side surfaces and the inner diameter 23 of the inner bearing ring the parts will be reversed and the working ribs 45, 46 and 47 will be on the outer surface of a plunger passed through the inner bore of the bearing ring to size and finish the surface 23. This plastic flow operation on the side surfaces 20 is called a coining operation, while that on the cylindrical surfaces 22 and 23 is called a sizing operation. The structure of Fig. 5 may be finished and sized in a similar manner. The side surfaces 20 are accurately finished and the outer member is brought to the desired accurate width by coining operation, as is also the mounting and locating surface 39 relative to the raceway. The mounting and locating surface 38 may be finished and brought to accurate size by sizing operations with a proper tool similar to that of Fig. 6 but designed for the surface to be sized. However, any type of tools capable of efficiently causing plastic flow for these operations may be used.

It is of first importance that this plastic flow during the coining operation provides two exactly parallel faces of the somewhat softer and more workable material, and that these plane surfaces lie in faces outwardly of the side surfaces of the hard alloy steel raceway ring, or, that is, the side surfaces of the hard alloy raceway ring are always inwardly or below the finished side surfaces of the outer member of softer and more workable material. In some cases high points of the hard raceway ring could reach to the level of the outer surfaces of the softer material, as where they might touch the coining tool, as indicated above, but they should never extend beyond the plane of these surfaces, and of course the balance of the hard steel surfaces will always be below or inwardly of the finished plane surfaces of the softer material forming the side face of the bearing. With this arrangement, the hard steel side faces of the raceway ring never need finishing as the softer and more workable material in a relatively thin layer has upon coining provided the exactly parallel and finished faces for bearing clamping when the bearing may be put into its assembled application in a machine.

This novel construction of the two materials of different characteristics may be fabricated by many distinctive types of operations such for example, to illustrate the more common, as die-casting the outer or softer member of appropriate metal, plastic molding of suitable plastics, powder metallurgy molding, or through use of a bi-material or bi-metal tubing, centrifugal casting or extrusion, to provide the bi-material construction or to build up the hard metal raceway ring with the softer material by electrolytic deposit of the softer metal on it, or by metal spray in a controlled atmosphere, and so forth.

It will be readily understood from the above that this new process of bearing ring fabrication provides a distinctively new way of assembling and finishing precision bearings with a higher degree of quality and uniformity than possible with present day processes of a given comparative degree, and one in which the faces and diameters (outside or bore) of the tough, hard cutting alloy steel rings need never be finished.

This new process comprising the steps of casting, molding or preforming of a permanently bonded relatively thin layer of a softer and more workable material to the finished size, such for example as by die-casting with the hard raceway steel ring held as an insert in the casting die and coining and sizing to exact finished dimensions, makes possible the complete fabrication of precision bearing rings in about five operations as contrasted with present day conventional stock removal processes which now require about ten operations, as outlined above. This process provides two vitally important improvements in bearing manufacturing and bearing operating art by elimination of those serious present day troubles of fabrication errors within the bearing itself, and also in the bearing mounting with associated parts outside the bearing itself.

For the purpose of clarity and simplification, the washing and de-greasing operations common to both the present day and the new processes have been omitted from this description.

The great saving in the number of operations required effects a two-fold gain in that a great decrease in the cost of fabrication results and, through elimination of so many machine chucking operations required for the present standard bearings, new errors existing with each operation are eliminated and a finer and more accurate fabrication is assured, resulting in superior bearing performance. Such errors as a slight eccentricity and wobble in one operation, when rechucked for a succeeding operation, may not have the high points of these faults in the same angular plane or relation as the high points of the errors in the preceding operation, so that by the time the many chucking operations are completed, the ring completely fabricated by present day processes may have such an appreciable magnitude of combined error variables at all angles as to decidedly affect the best bearing operation. Many times they reach magnitudes leading to rejection in the bearing manufacturing plant and also rejection in the customer's plant on high speed or accurate instrument assembly. The decrease in the number of operations effected by this new process assures a definitely superior product through decrease of these possible errors in present day processes, and an increase of uniformity in the bearings produced because of the stabilized and exact nature of the mold and sizing tools of the new process.

In general, this new process of bearing ring fabrication will follow the operations about as illustrated and described in connection with the accompanying drawing, but of course certain modifications may be necessary to suit, for example, the relation of melting point temperature of the softer and more workable material used for a particular case with the hardening and normalizing technique of the hard alloy steel raceway ring, and in most efficiently meeting as well the wide range of sizes and applications required.

Another alternative is to harden the alloy steel raceway ring after controlled atmosphere brazing by quenching while in the cooling zone and still hot from the brazing operation, rather than before bonding as for the die casting operation described.

The following briefly described methods are given as examples of ways in which this process may be effectively carried out, but it is to be understood that these do not comprise the only ways in which the process may be performed.

For example, hard and tough ball bearing steel, such as SAE 4615 or SAE 52,100 commonly used, or other selected hard metal for some special application in solid rod, tubing, or in forging form, may be placed in an automatic screw machine or turret lathe and turned and cut off into individual rings, the outer cylindrical surface of the outer ring (or bore of the inner ring) is knurled or otherwise roughened for the best bonding of the backing ring thereto, and the raceway surface and surface in which it is located rough formed to predetermined size for location for the molding operation to follow. Other than providing parallel faces there is nothing of an accurate nature required in turning this hard steel, as it does not have to be finished all over several times as in present day processes for finishing the standard solid one-piece bearing ring, so that highest fabrication feeds and speeds can be conservatively maintained in mass production of the ring.

The individual rings are now hardened and normalized in the conventional manner for the alloy steel that is used, or by the preferred electric induction heating method for both operations in view of its most excellent minute and exact control of the degree of temperature and of heat flow desired.

If the outer softer and more workable material is to be die cast, the hardened rings are next mounted in the loading fixture in gangs and preheated to the proper temperature for rapid insertion loading in the pressure die casting dies or molds of a pressure die casting machine, so that casting to size of the relatively thin layer of softer and more workable material (such as the well known suitable die casting metals and alloys, for example zinc, magnesium, and their alloys, brass or bronze alloys, etc.) may be most exact and uniform. By proper design of the dies the molded rings may be made by this method without drawing the hardened ring temper, and this is further assured because the volume of the relatively thin metal ring cast against the hardened ring is small as compared with that of the hardened ring. Upon removal from the die the castings are machine-trimmed and made ready for the final operations. This pressure molding or casting fully eliminates all of the normal hand screw operations of conventional processes where grooves of all types are cut in the hard steel, as the mold may accurately form the grooves of the desired shapes and also form the letters of the ring marking for identification of size and type when finished. It also permits the forming of a groove in the side of the bearing of a size and shape which enables one groove to serve for all types of dust plates, grease shields, seals or other similar cover parts. This allows for different sizes to be made the same way, that is, they may be standardized, thus reducing the number of sizes or types to be carried, greatly facilitating and permitting full production.

The bonded bi-material rings are now ready for the coining and sizing operations in dieing machines or stamping-drawing presses. In these operations the softer and more workable material plastic-flows or cold-flows from its finished cast size to its exact dimensional finish size under coining dies which control the width of the ring and hold the ring for the sizing broach operation which controls the diameters.

The rings are now finished except for the final raceway grinding and lapping operation which may be done at one time or setting, or in two steps, as preferred. This new process provides a means of supporting and holding the ring at this dust plate groove or where a portion of the side surfaces of the raceway ring are exposed, by permitting clamping or gripping of these side surfaces so that the final raceway surface and the bearing supporting surface (whether this latter surface is of standard bearing shape, as in Figs. 1 to 3, or is located on an extended end frame, as shown for example in Fig. 5) may be finished at the same time and the same machine setting, and will be in exact radial and axial concentric alignment, assuring a far superior precision bearing of better performance under all conditions than is now possible by present day processes.

Instead of die-casting the outer or backing ring of die-cast metal, it may for certain bearing applications be molded under suitable heat and pressure of suitable non-metallic plastic materials (such for example as acrylic, cellulose acetate, phenolic resins, urea, vinyl, etc.) which will be permanently bonded to the surface of the hard alloy raceway ring in a manner similar to that of the die-cast metal, and the ring with these materials can be molded quite accurately to substantially the finish size and shape and then brought to the exact dimensions by coining and sizing operations through plastic-flow or cold working without removal of stock, the same as described in connection with the die-cast metal.

Another modified method similar to the die-cast and plastic molding machine methods just described is by molding the backing member of softer and more workable material by the so-called powder metallurgy method. In general, this is similar to die-casting or plastic molding. In this modified process the steel alloy raceway rings are not hardened before the molding operation as in the die-casting and plastic molding operations. These cut-off raceway rings when finished the same as used in the die-casting and plastic molding, are used as inserts in the special powder metallurgy mold where the metal powder is pressed into the form of the finished ring size under terrific pressure. The completely formed rings are then sintered in furnaces made for that purpose. Before final cooling, however, the fabricated ring is drawn out while hot for oil-quench hardening and the following normalizing operation at proper temperatures with rigid control. They may also be heat-treated to provide great strength for the backing member if such is required beyond the usual degree of strength. Normally this backing material remains sufficiently soft or of a degree of hardness to permit use of the coining and sizing operations for extreme and uniform precision accuracy. The raceway grinding and surface finishing operations are identical with those previously described.

Another modification, particularly adapted for large sizes of bearings, is to permanently bond the two rings of different materials by controlled atmosphere brazing. For this modified process, as for the die-casting and plastic molding methods, the raceway ring may be made of ball-bearing steel tubing of somewhat thinner wall thickness than used for making the standard ring under present methods, so that the rough turned cut-off ring is somewhat smaller than the desired finish size. In this method, however, the ring does not require a roughening operation of the surface to be used for the bonding of the backing member or members, as it uses the copper brazing technique for bonding the backing member to the raceway ring. The backing member may consist of any preformed pressed metal or drawn shape which is pressed on the raceway ring to the exact proper position. The raceway ring stock is either copper plated on the surface to which the backing member is to be bonded, or the copper wire method is used as is normal in this method of bonding parts together, in which a copper wire is placed at the edge of the joining surfaces between the two metals and when heated to a fusing temperature in the controlled atmosphere it runs into the joint between the metals and permanently bonds them together. This would be a construction similar to that shown in Fig. 3 of the present drawing.

With these rings, while in the "soaking" zone of the cooling chamber region of the usual controlled atmosphere brazing furnace, the rings may be removed at the proper temperature for the oil-quench hardening operation, and are then normalized in the usual manner. Very mild low carbon steel may be used for the relatively thin outer or backing member which does not harden sufficiently but that the coining and sizing operations previously described can be used to assure exact or precision accuracy. Just prior to the coining and sizing operations the rings may be stamped with the die number and type designation as may be preferred. A backing member providing the supporting surface (in the case of the outer ring) may be used in the chucking location for the raceway in the raceway grinding machine. This assures super-accuracy as the supporting surface is in exact alignment of concentricity and parallelsim with the raceway surface for the rolling elements, making for extreme accuracy of the finished product, which is a great improvement over the present mounting practice.

Figure 7:
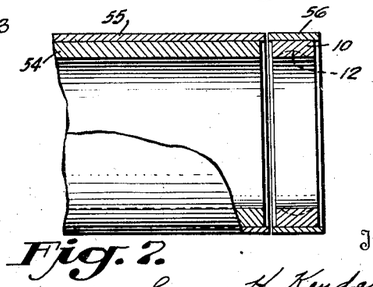
Fig. 7 illustrates one way of forming the ring members.

A somewhat similar method more adaptable for the smaller sizes is to draw a composite tube as shown in Fig. 7, the initial tubing being composed of both a ball bearing alloy steel tube 54 and a backing tubing member 55 of the softer and more workable material, the two being drawn down to size together through standard tubing drawbench dies made for this purpose of composite tube drawing operation. The tube forming the inner member has its outer surface copper plated providing the necessary even dispersion of brazing metal for the brazing operation.

By means of specially formed cut-off tools, it can be assured that the backing member 56 of the relatively soft and more workable material is wider than the raceway ring 10 of the special alloy steel, so that the coining and sizing operations can be readily performed in the manner specified. This is substantially the structure shown in Fig. 3. These forming tools may be specially designed to assure surfaces acceptable for the facing operation and the resulting finished ring surface.

Rings may be stamped with the type, number and firm name as desired and are then ready for the controlled atmosphere brazing operation. While in the cooling zone of this furnace and at the proper temperature they are removed and oil-quench hardened in the usual manner, as well as being given the usual normalizing treatment. The material of the backing member does not harden sufficiently but that it readily conforms to the coining and sizing operations to bring it to the exact size required. The rings are then ready for the final raceway grinding operation and are later lapped in the usual way, or if preferred by the manufacturer, these can be performed in one operation. The exposed side surfaces of the raceway ring spaced a short distance inwardly of the side surfaces of the backing member, provide clamping surfaces for holding the composite ring for these operations, and also provide space for dust shields and similar plates which may be secured in position by staking or spinning over the edges of the backing member, as indicated in Fig. 4.

A method which is most applicable to the very large size rings is one in which a forged raceway ring of ball bearing steel is first rough-turned on the raceway land surface to provide an accurate mold-centering surface for centrifugal pressure casting operations of the softer and more workable material against the opposite surface of the ring, which may be formed with extreme accuracy. The molds may be designed in sections for rapid handling and may be provided with water cooling for quick chilling of the parts being cast. Distinctive design of mold gates, sprues and runners with high cope construction for vertical casting may be adopted as part of the special technique required to assure uniform rigid control and accurate casting methods. Quick cooling technique can also be employed in molds with special surface finishes for aiding in the final coining and sizing operations. Machine die trimming operation assures accurate handling after removal from the mold. This method also permits producing any shape that can be molded for simplification of the bearing mounting technique and without added operation costs. The final coining and sizing operations and the final grinding and lapping of the raceway surfaces are performed as previously described. An advantage of this method is that it assures that the raceway surface is in exact concentric and lateral alignment with the supporting surface or surfaces, doing away with the usual errors of the multiplicity of chucking operations required in the making of the standard one-piece bearing rings.

A number of other methods may be employed, such for example as building up the backing member of softer and more workable material by electrolytic plating, or it could be built up by spraying on molten metal in a controlled atmosphere. However, cost economies are not as attractive in these methods as in those previously described.

It is to be noted that all the methods described can be handled by well known standard machines of present day manufacture now on the market, and having highly developed art technique behind them to assure uniformity of production of the highest order in everyday use. Costs of fabrication can be, therefore, closely estimated with the assurance that production variables will not differ widely from them. It will also be seen that with this process major economies in manufacture are readily possible beyond those required for making the standard bearings of one solid piece.

Comparative manufacturing costs (material, labor and overhead) using the same factors, rates and efficiency percentages of normally established factory estimating procedure, disclose that by this new process rings may be produced in quantity production at from 35% to 40% less than by present day processes. By comparative costs is meant that all factors of one process that are the same are equally applied to the other process, so that if one expert feels that his costs are lower they will also automatically lower the other process costs as well, which illustrates that the new process value is just about as given in the percentage differences specified.

Also within the scope of the invention is the exceptional case or critical application of providing a bond between the two materials beyond that of the normal preheating of the bearing insert or raceway ring with roughened surfaces by use of chemical bonds or various types of surface and slight surface penetration, such as are now available, as well as a controlled atmosphere type of copper or silver solder brazing in its many forms.

In general, the bonding of the parent metal (metal with the higher melting point temperature, in this case the hardened steel raceway ring) is accomplished by roughening the embedded surfaces of the ring to which is to be cast, molded or built up the softer or more workable material. Its purpose is broadly to provide a surface of irregular major peaks and valleys (such, to illustrate, as a file surface) so that the otherwise smooth surface will have its surface area greatly increased, sometimes to nearly double the area of the smooth surface. This assures the greatest uneven and strong gripping surface for the bonding metal or material to flow or be pressed by plastic deformation, in place. The more uneven, torn or ragged the surface of the parent metal the better for the bonding operation.

The metal surface of the hardened steel ring of the standard bearing is usually treated to produce an extremely clean surface free from foreign matter, dirt and oxides (such as chrome oxide) which in some cases may make it desirable to cover the metal surface by pre-dipping with a proper flux, or thin electrolytic plating, with a thin protecting film. When the parent metal of the raceway ring of the present process is similarly treated and kept in this condition, the surface is most easily "wet" for best bonding with the softer metal or material by any of the many possible methods. A good "wetting" is usually assured with low surface tension causing the fused material to thinly flow most readily to creep into and entirely fill the minute pores of the parent metal surface. For best "wetting" of the surfaces for strongest bonds the surfaces should not be polished, rolled or plastic-flowed or cold-worked, as this tends to close the metal surface pores, but should preferably be shot-blasted by sharp grit free from foreign matter that might become embedded in the roughened surface of the parent metal. It is therefore desirable to use the greatest care in the preparation and protection of the parent metal surfaces to be bonded, whether the bond is to be produced by the usual insert preheating prior to the die-casting or plastic molding operation, or through use of fluxes of extreme fluidity and penetration powers with protection against oxide, or with brazing alloys or cements of proper fusing temperature for handling between the hardened alloy steel parent metal and the backing member.

That is, to illustrate as an example, the brazing alloy or cement may fuse from the heat of the die-casting or plastic molding material coming in contact with the parent metal, or it may be desirable to produce the final fusion from induction heating, with its capability of exact control, applied through the parent metal ring itself after the die-casting or plastic molding operation. Further, where bi-metallic tubing is used, the inner tube may have a plating of fusible alloy, such as copper, silver solder alloy, and so forth, as may be best and most suitable for the specific application, which will be drawn between the two tubes in the final tubing draw in making the bi-metallic tubing and later fused by controlled atmosphere furnaces or induction heating units applied to the complete tubing or to the individual rings after the cut-off operation.

In general, therefore, the bonding between the two materials used in this new process for greatest strength and toughness, is most uniformly assured by rigid control of the surface of the parent metal, its surface preparation and freedom from oxides, and the use of low surface tension fusing materials, providing the most thorough "wetting" power of the metal surfaces to thoroughly fill every minute surface pore, thus in effect producing an interlocking and knitting effect or blending of the joined materials.

Another particular advantage in this process of the use of the relatively thin backing member over the hardened steel raceway ring is that it permits vital control of temperature in the diecasting or plastic molding die. By control of temperature is meant effectively limiting the temperature, either higher or lower, to suit the application of the backing material used so as not to draw the temper of the hardened steel raceway ring below its satisfactory working degree of hardness. The relatively thin layer has only a small total mass in proportion to the mass of the steel raceway ring, so that the temperature of this ring cannot rise too high when under rigid mold control of temperature entirely possible and practical with the die construction which may be used in this process. That is, on "hot metals" (those with high melting temperatures) the relatively thin layer will chill very rapidly in the close surface contact with a chilled insert and the chilled mold, to closely and rigidly control the desired temperatures for the most effective and strong bonding of the backing material and the steel insert ring. This has special value where it may also be desired to chemically bond by minute control of heat before or after the molding operation or in combination with the hardening cycle under induction heating equipment control, as previously outlined. This applies to the standard shape of bearing, such as shown in Figs. 1, 2 and 3, and particularly to constructions where the backing member is extended in the form of a web or flange of an end frame or the like, as illustrated in Fig. 5, as through the surfaces 20, 28 and 49 in contact with the molds the temperatures (heating or cooling) may be readily controlled. Also the temperatures can be controlled through the mold pin 50 and sleeve 51 which are used for locating and centering the insert raceway ring and holding it during the casting or molding operation by reduced portion 52 on the pin entering the bore of the ring and the shoulder 53 at the base of this reduced portion clamping the inner portion of the surface 26 at one side of the ring immediately outward of this bore, and the sleeve 51 slidable on the reduced portion 52 clamping the similar portion of the surface 26 at the other side of the ring. This clamping and holding of the ring by the surfaces 26 insure that the clamped portions of these surfaces are not covered by the cast or molded material and form the spaces 28 for mounting the dust plates, grease shields, seals or other plates. The shoulder 53 and the end 54 of sleeve 51 are shown by dotted lines in Fig. 5 spaced a short distance from the surfaces 26 for clarity. The softer material of the rings of Figs. 2 and 3 can be cast about the raceway ring while it is held in die casting dies in the same manner.

In the forms of Figs. 1, 2 and 3, the mounting and locating surfaces are the side surfaces of the finished rings and the outer diameters or surfaces 22 and 23 the same as in the standard solid bearing ring. In the form of Fig. 5 the side surfaces 20 and diameters 48 and 49 may be brought to the finished size by plastic flow, as for example by coining and sizing operations, but in this form the backing material 35 is also extended by the web or spokes 36 into a rim portion 37 on which may be formed locating and mounting surfaces 38 and 39 which may also be brought to finished dimensions by plastic flow or cold working operations. The methods of treating and finishing are therefore the same except the surfaces 38 and 39 are located farther from the raceway rings.

In the specification and claims the terms "casting" and "molding" are used practically synonymously, as castings are formed and shaped in molds and therefore casting is broadly a molding operation. Also, shaping and molding such materials as the non-metallic plastics may be broadly called a casting operation as they are shaped in molds.

Although hardened steel has been mentioned as the material that would probably be most generally used for the insert raceway ring, it is to be understood that the invention is not limited to use of this material. Any suitable material may be employed, as for example stainless steel, or bronze or glass may be required for special jobs such as would be needed in process industries in the presence of acids.

Although coining and sizing operations or tools have been mentioned as particularly adapted for the cold working of the surfaces of the softer and more workable material to bring these surfaces to the exact size or dimensions and finish, it will be understood the process is not limited to this as other plastic flow or cold working methods or tools could be used. Examples are swaging, spinning, rolling, burnishing, drifting, and so forth.

A distinct advantage of this process is that after the composite ring has been made, brought to finished size and dimensions and the mounting surfaces accurately finished and located by the plastic working operations, the raceway for the rolling elements may be finally finished to free it of all process distortions. This definitely produces a very superior product, and one which may be made with extreme accuracy. This is applicable to all the forms shown and described, and is particularly advantageous where the mounting or locating surface or surfaces are located on an extended backing member such as the type shown in Fig. 5, and similar arrangements as described in connection with this figure.

Having thus set forth the nature of my invention, what I claim is:

1. The process of making finished anti-friction bearing rings which comprises forming a continuous raceway ring of difficultly workable metal with an unfinished raceway surface for rolling elements and of sufficient thickness to carry the normal rolling load and of somewhat less width and a different diameter opposite its raceway surface than the finished bearing ring, adding to the raceway ring opposite the raceway surface and permanently and rigidly fixing thereto so that they are bonded sufficient of a softer and more readily workable metal to bring the raceway ring to a size slightly greater than the size of the finished ring, plastic working outer surfaces of the added metal to bring the resulting ring to the desired width and diameter, and finishing the raceway to final size and surface finish after bonding of the two metals.

2. The process of making finished anti-friction bearing rings which comprises forming a continuous one piece raceway ring of difficultly workable metal of a size less than that of the finished ring and with an unfinished raceway for rolling elements, adding to the raceway ring and permanently and rigidly fixing thereto so that they are bonded sufficient of a more readily workable material to bring said raceway ring to a size slightly greater than the desired size, plastic working outer surfaces of the added material to bring the resulting member to the desired finished size and form a mounting surface thereon, and finishing the raceway and aligning it with the mounting surface after bonding of the two materials.

3. The process of making finished anti-friction bearing rings which comprises forming a continuous one piece raceway ring of difficultly workable metal with an unfinished raceway for rolling elements and of a size somewhat less than that of the finished ring, molding under pressure about the ring at the surface opposite the raceway and at the sides of the ring and permanently and rigidly fixing thereto so that they are bonded sufficient of a different and more readily workable material to bring the raceway ring to a size slightly over the finished size, bringing the resultant member to the exact width by coining operations on the side surfaces of the molded material and bringing it to the desired diameter by plastic working the curved surface of said latter material by sizing operations, and finishing the raceway and aligning it with said surfaces after bonding of the two materials.

4. The process of making a finished anti-friction bearing ring which comprises forming a continuous one piece raceway ring of difficultly workable metal with an unfinished raceway for rolling elements and of a size somewhat less than that of the finished ring, pressure casting to substantially finished size a second ring section of different and more readily workable metal against the raceway ring and permanently and rigidly fixing thereto so that the two rings are bonded, plastic working surface portions of the cast metal to bring the resultant member to the finished size, and finishing the raceway after bonding of the two metals.

5. The process of making finished anti-friction bearing rings which comprises forming a continuous one piece raceway ring of difficultly workable alloy steel with an unfinished raceway for rolling elements and of a size somewhat less than that of the finished ring, pressure casting to substantially finished size a backing member of more readily workable metal against the raceway ring and permanently and rigidly fixing it thereto so that they are bonded, plastic working surface portions of the cast metal by coining and sizing operations to bring the resultant member to finished size and form a mounting surface thereon, and finishing the raceway and aligning it with the mounting surface after bonding of the two metals.

6. The process of making finished anti-friction bearing rings which comprises cutting from a tube of difficultly workable alloy bearing steel a raceway ring of somewhat less width and different diameter than that of the finished ring, adding to the ring and permanently and rigidly fixing thereto so that they are bonded sufficient of a softer and more workable material to bring the ring to a size slightly greater than that of the finished ring with the sides of the added material extending beyond the side surfaces of the raceway ring, finishing the side surfaces and mounting surface of the resulting ring to finished size by plastic working outer surfaces of the added material, and finishing on the raceway ring after bonding of the two materials a raceway for rolling elements.

7. The process of making finished anti-friction bearing rings which comprises drawing to substantially the desired finished ring size a composite tube comprising closely fitting tubes one of which is of tough difficultly workable alloy bearing steel of sufficient thickness to carry the normal rolling load, and the other a relatively thin tube of softer and more readily workable metal, cutting the composite tube transversely into rings with the steel portion somewhat narrower than the softer portion, plastic working the side and exposed cylindrical surfaces of the softer metal to finish the rings to the desired width and diameter, and finishing on the tough alloy bearing steel a raceway for rolling elements.

8. The process of making finished anti-friction bearing rings which comprises forming a raceway ring of difficultly workable alloy bearing steel of a size somewhat smaller than that of the finished ring, building up the raceway ring to substantially finished size by adding to the face opposite the raceway a softer and more readily workable material and extending this material beyond the side surfaces of the raceway ring, plastic working exposed surfaces of the softer material to bring the resulting ring to the desired finished width and diameter, placing an additional member against a side surface of the raceway ring and securing it in place by working adjacent portions of the softer material over the edge of said member.

9. The process of making finished anti-friction bearing rings which comprises forming a raceway ring of difficultly workable alloy bearing steel of somewhat smaller size than the finished ring, building up the raceway ring to substantially finished size by pressure casting against the ring a softer and more workable metal leaving portions of the side faces of the raceway ring exposed and with the softer metal extending beyond these faces, plastic working exposed surfaces of the softer metal to bring the resultant ring to finished size, placing a plate member against an exposed side face of the raceway ring and securing it in place by working the adjacent portion of the softer metal over the edge of the plate.

10. The process of making a finished anti-friction bearing ring which comprises forming a raceway ring of difficultly workable bearing steel and with an unfinished raceway for rolling elements, pressure molding against said ring and rigidly fixing it thereto so that they are bonded a backing member of a softer and more workable material provided at a distance from the raceway ring with mounting and locating surfaces concentric with the ring, finishing said surfaces to the finished dimensions and location by plastic working operations on the material forming these surfaces, and finishing the raceway and aligning it with said surfaces after the bonding of the two materials.

11. The process of making a finished anti-friction bearing ring which comprises providing a composite ring including a raceway ring of difficultly workable bearing steel provided with an unfinished raceway for rolling elements and a backing member of softer and more workable metal rigidly fixed thereto so that they are bonded covering the surface opposite the raceway and extending beyond the side faces of the raceway ring, plastic working the softer metal by coining and sizing operations on this metal to bring the composite ring to finished diameter and width, and finishing the raceway and aligning it with the worked surfaces after bonding of the two metals.

12. The process of making a finished anti-friction bearing ring which comprises providing an unfinished composite ring including a raceway ring of difficultly workable bearing steel provided with an unfinished raceway for rolling elements and a backing member of softer and more workable material permanently and rigidly fixed thereto so that they are bonded covering the surface opposite the raceway and provided with mounting and locating surfaces, plastic working of the material of said surfaces to bring said surfaces to the finished dimensions, and finishing the raceway and aligning it with said surfaces after bonding of the two materials.

13. The process of making an anti-friction bearing member which comprises forming a raceway ring of a difficultly workable metal with an unfinished raceway for rolling elements and of somewhat less than finished size, permanently and rigidly fixing to the surface of the ring opposite the raceway so that they are bonded a softer and more workable material to bring the ring to at least the finished size and providing thereon mounting and locating surfaces, plastic working these surfaces to bring said mounting and locating surfaces to the finished dimensions, mounting the member on supporting means and locating it by said finished surfaces, and finally finishing the raceway surface and aligning it with the other surfaces while the member is so held and after bonding of the two materials.

14. The process of making a finished anti-friction bearing member which comprises forming a raceway ring of difficultly workable metal and an unfinished raceway for rolling elements and of somewhat less than finished size, permanently and rigidly fixing to the surface thereof opposite the raceway so that they are bonded sufficient of a softer and more workable material to bring the ring to at least the finished size and providing a mounting surface thereon with the softer material extending beyond the side surfaces of the ring leaving at least a portion of these surfaces exposed, gripping and holding the ring by clamping the side surfaces of the raceway ring, and finishing the surface of the raceway and the mounting surface to finished dimensions and alignment with each other while the member is so held and after bonding of the two materials.

15. The process of making a finished anti-friction bearing ring which comprises forming a continuous one piece raceway ring of difficultly workable metal provided with an unfinished raceway for rolling elements with a backing member of softer and more workable material permanently and rigidly fixed thereto so that they are bonded, forming by means of the softer material a mounting space for an added member distinct and separate from the raceway ring, finishing the raceway after bonding of the two materials, and securing the added member to the ring by working the softer material to cause plastic flow of this material over the member.

16. The process of making finished anti-friction bearing rings which comprises forming a composite ring by making a difficultly workable metal raceway ring having an unfinished raceway for rolling elements and of sufficient thickness to carry the normal rolling load and permanently and rigidly fixing thereto so that they are bonded sufficient of a more readily workable material to give the ring substantially the finished size, plastic working surface portions of the more workable material to bring the resultant composite ring to the desired finished diameter and width, and finishing the raceway and aligning it with said surfaces after bonding of the two materials.

17. The process of making finished anti-friction bearing rings which comprises forming an unfinished composite ring of a difficultly workable metal raceway ring having an unfinished raceway for rolling elements and of sufficient thickness to carry the normal rolling load to which is permanently and rigidly fixed so that they are bonded sufficient of a more workable metal to give the composite ring substantially the finished size and shape, plastic working surfaces of the more workable metal to bring the composite member to the desired finished size and form a mounting surface thereon, and finishing the raceway and aligning it with the mounting surface after bonding of the two metals.

18. The process of making a finished anti-friction bearing ring which comprises providing a composite ring including a raceway ring of difficultly workable bearing steel provided with an unfinished raceway for rolling elements and a coating of bonding material covering the surface opposite the raceway and a backing member of softer and more workable material covering said coating and extending somewhat beyond the side faces of the raceway ring, heating to permanently bond the ring and backing member together, plastic working exposed surfaces of the softer material by coining and sizing operations on this material to bring the composite ring to finished size, and finishing the raceway and aligning it with the worked surfaces after bonding of the two members.

19. The process of making finished anti-friction bearing rings which comprises drawing to substantially the desired finished ring size a composite tube comprising closely fitting tubes with a coating of bonding material between them one of which tubes is of tough difficultly workable alloy bearing steel of sufficient thickness to carry the normal rolling load and the other a relatively thin tube of softer and more workable metal, cutting the composite tube transversely into rings with the steel portion somewhat narrower than the softer portion, heating to permanently bond the two rings together, plastic working the side and exposed cylindrical surfaces of the softer metal to finish the rings to the desired width and diameter, and finishing a raceway for rolling elements on the tough alloy bearing steel and aligning it with said surfaces after bonding of the two rings.

GEORGE H. KENDALL.